United States Patent
Matsumoto et al.

(10) Patent No.: US 6,883,805 B2
(45) Date of Patent: Apr. 26, 2005

(54) MULTIFUNCTIONAL GASKET

(75) Inventors: Kenji Matsumoto, Okayama (JP); Eiji Tomita, Okayama (JP); Sadami Yoshiyama, Okayama (JP)

(73) Assignee: Uchiyama Manufacturing Corp., Okayama (JP)

(*) Notice: Subject to any disclaimer, the term of this patent is extended or adjusted under 35 U.S.C. 154(b) by 0 days.

(21) Appl. No.: 10/817,856

(22) Filed: Apr. 6, 2004

(65) Prior Publication Data

US 2004/0256129 A1 Dec. 23, 2004

(30) Foreign Application Priority Data

Apr. 7, 2003 (JP) .................................... 2003-102403

(51) Int. Cl.$^7$ ............................................... F02F 11/00
(52) U.S. Cl. ....................................... 277/594; 277/939
(58) Field of Search ............................... 277/592, 594, 277/939; 174/35 GC

(56) References Cited

U.S. PATENT DOCUMENTS 6,641,142 B2 * 11/2003 Hegmann et al. ........... 277/594
6,719,300 B2 *  4/2004 Fujino et al. ............... 277/591
6,746,021 B2 *  6/2004 Breen ........................ 277/594

* cited by examiner

*Primary Examiner*—Hung V. Ngo
(74) *Attorney, Agent, or Firm*—Bacon & Thomas

(57) ABSTRACT

A multifunctional gasket intervened between two objects including a space to be sealed comprises a conductive metal base plate layer, an insulation layer integrally laminated at the upper and lower surfaces of the conductive metal base plate layer, and a microseal coating layer coated on the outer surface of the insulation layer. An annular bead structure is formed around an opening corresponding to the space, and when the gasket is intervened between the two objects to be integrated, one end of the conductive metal base plate layer faces the inside of the space and the other end thereof is exposed outside.

9 Claims, 8 Drawing Sheets

MULTIFUNCTIONAL GASKET

FIELD OF THE INVENTION

The present invention relates to a multi functional gasket which is interposed between two objects having a space to be sealed such as a cylinder head and a cylinder block of an engine as to seal the spaces and which is capable of sealing the spaces and of converting the temperature, the pressure, the combustion condition (combustion time), the vibration, further the density, the concentration, the component of gas or liquid in the space into electric signals to be taken out, and is capable of supplying a supplementary power for combustion.

PRIOR ART

There has been disclosed a gasket in which a liner or probe type detection body is insulated and embedded therein, and such a gasket is intervened under pressure between a cylinder head and a cylinder block for directly detecting fire spreading in the combustion chamber in an automobile engine and the like. (For example, JP-A-63-66431 and JP-A-04-308339 propose and disclose such a gasket.) This type gasket, namely a gasket embedding an ion sensor is intervened under pressure between the cylinder head and the cylinder block for achieving an inherent sealing function as a gasket. And the tip end of the electrode of the ion sensor faces to the combustion chamber and the sensor is designed such that it detects the combustion condition in the combustion chamber by measuring the change in current at the moment when fire having been generated in the combustion chamber reaches at the end of the electrode, when voltage is applied between the electrode and the cylinder head and the cylinder block, each of them being grounded.

Such an ion sensor is embedded in the gasket intervened under pressure between the cylinder head and the cylinder block so that the installation position of the ion sensor isn't limited and the combustion condition at a desired area can be precisely detected. Therefore, such a gasket is expected to be realized and utilized in the field of the automobile engine and so on in the future.

The gasket disclosed in JP-B-06-84785 isn't such a gasket embedding an ion sensor, but is a gasket constructed such that a compound layer including a basic fiber, a rubber material, an inorganic filler material or the like is coated on the surface of a metal plate. This gasket has been widely used for an engine and as several types of gaskets because it has superior sealing efficiency and thermal resistance achieved by a reinforcing function of a metal plate, drift of a rubber material because of the basic fiber, a peeling prevention function and so on.

When such a gasket embedding an ion sensor as mentioned above is intervened under pressure between the cylinder head and the cylinder block, it is required to keep the sealing function for gas around a cylinder bore by increasing the setting pressure against the upper and the lower surfaces of the gasket. However, when trying to increase the setting pressure of the gasket, there would cause crack and so on in the gasket (insulation seal layer), which contacts with the upper surface and the lower surface of a liner or probe type electrode of the ion sensor which is embedded in the gasket, because of the thickness of the electrode, thereby causing a problem of not ensuring the sealing capability for the ion sensor.

Therefore, such a crack may be prevented by making the electrode of the ion sensor as narrow or thin as possible. According to such a narrow electrode, the tip end thereof at the combustion chamber side may be melted by the fire and an engine may be destroyed by pre-ignition phenomena which is caused by the fact the tip end turns into an ignition source. Gasket embedding an ion sensor (bore grommet type) in which the liner or probe type electrode as mentioned above is used as an ion sensor also has such a problem that its production cost is increased because the ion sensor is made as such part as to be optionally attached to a gasket.

The gasket using a metal plate as disclosed in JP-B-06-084785 has good sealing ability and heat resistance and has no fear of causing crack in the compound layer because of the reinforcing function of a base fiber. However, it doesn't consider the electconductivity of the metal sheet and the electric insulation ability of the compound layer, so that such a gasket hasn't been applied to the gasket with an ion sensor function.

SUMMARY OF THE INVENTION

The present invention has been proposed to solve the above-mentioned problems and its object is to provide a multifunctional gasket in which its sealing ability is preferably kept, the above-mentioned crack and the like aren't caused, the electrical information in the space to be sealed is preferably taken out as electric signals, an electrical operation is loaded in the space to be sealed, and further multipurpose function is achieved for controlling the engine and other equipment which require several kinds of sealing.

According to the first aspect of the present invention, a multifunctional gasket intervened between two objects including a space to be sealed, the gasket comprises a conductive metal base plate layer, an insulation layer integrally laminated at the upper and lower surfaces of the conductive metal base plate layer, and a microseal coating layer coated on the outer surface of the insulation layer. An annular bead structure is provided around an opening formed corresponding to the space, and when the gasket is intervened between the two objects to be integrated, one end of the conductive metal base plate layer faces the inside of the space and the other end thereof is exposed outside.

According to the second aspect of the present invention, the conductive metal base plate layer is formed of any one of metal sheet with 0.1 to 0.5 mm thickness, selected from a low carbon steel plate, stainless steel plate, an aluminum plate, and a copper plate.

According to the third aspect of the present invention, the conductive metal base plate layer has a thickness of 1 $\mu$m to 0.5 mm and is formed of any one of a process layer selected from a plastic layer, a ceramic layer, a ceramic fiber layer, an asbestos layer, an adhesive layer, or such conductive metal base plate layer of which surface is processed with a metal surface processing agent. The insulation layer is integrally formed on both sides of the conductive metal layer. The metal surface processing agent is a rust-preventive agent, a surface curing agent, a surface lubricant, a friction/abrasion reducing agent or a galvanizing in order to be used for protecting the conductive metal base plate or assuring its familiarity and the processing layer processed with these processing agent forms an electric insulation layer.

According to the fourth aspect of the present invention, the microseal coating layer has a thickness of 1 $\mu$m to 0.5 mm and formed of such layer that any one of layer selected from a rubber material including an inorganic power material, a plastic material, or an adhesive is integrally covered on the conductive metal base plate layer. More specifically, a layer in which synthetic resin is mixed as a binder in graphite, a synthetic resin layer in which silica, calcium carbonate, magnesium oxide, aluminum oxide or the like is used as a filler, or a rubber layer such as silicone is applied.

According to the above-mentioned construction, when a gasket is screwed while being intervened between two objects, the restoring elasticity accompanied with an elastic deformation by the compressed bead structure acts on the facing surfaces between two objects and their mutual setting pressure intervening the gasket is strongly kept. Therefore, the sealing of the space to be sealed is extremely preferably kept. Further, a microseal coating layer is intervened between the conductive metal base plate layer and the end surface of the two objects, thereby filling small convexo-concave parts on the surface of the end and the conductive metal base plate layer to further improve the sealing ability.

When the multifunctional gasket of the present invention is intervened between two objects to be integrated, the side end at the space side of the conductive metal base plate layer faces the space and the other end is exposed outside, so that the electrical information in the space is introduced as electric signals from the conductive metal base plate layer. Or when a heater and so on is connected to the side end at the space side of the conductive metal base plate layer and power voltage is applied at the other end, electric load is acted in the space. Further, the conductive metal base plate layer is constructed such that the electric insulation layer is attached on both sides thereof to be integrated, so that the conductive metal base plate layer is electrically insulated between the ends of the two objects and it has no fear of leakage of the electric signals based on the electrical information from the ends, thereby enabling to take out of electric signals with high accuracy and acting of electrical load.

When the materials as mentioned in the third aspect of the invention are used for the electric insulation layer, the electric insulation ability is preferably kept and the elasticity followed by the deformation of the conductive metal base plate layer is achieved when the bead structure is processed. Therefore, there is no fear of causing clack in the electric insulation layer in case of screwing when the liner or probe type electrode is provided.

According to the fourth aspect of the present invention, two objects mentioned in the above aspects are a cylinder block and a cylinder head and the space is a cylinder bore respectively. Further according to the sixth aspect of the present invention, the information concerning the electrical variance in the cylinder bore is let out in the form of electrical signal from the conductive metal base plate layer, and still further, according to the seventh aspect of the present invention, the electrical signal concerns information on a combustion characteristic in the cylinder bore.

In the aspects mentioned above, the present invention is supposed to be applied to a gasket of a vehicle engine. When the gasket of the present invention is intervened between the cylinder head and the cylinder block of the engine to be integrated by screwing, the part at the space side of the conductive metal base plate layer, namely the end at the cylinder bore side, faces the cylinder bore (combustion chamber) and the other end is exposed outside of the engine. Therefore, when the cylinder head and/or the cylinder block are grounded, a power source is connected to the exposed part, and electric potential (for example 90V) is applied therebetween, a circuit is constructed via a fire area in ionic conditions at the moment when a fire is reached to the end of the conductive metal basic plate layer which is an electrode provided so as to face the combustion chamber of the engine. The current value at the moment is amplified by an amplifier to be processed in an information processing unit, thereby detecting the combustion characteristic in the combustion chamber (combustion time, namely the time that the combustion proceeds).

Other than detecting the combustion characteristic (combustion time and so on) in the combustion chamber in the engine, the temperature, pressure, vibration, gas concentration, gas component, fuel concentration, fuel density in the combustion chamber can be converted into electric signals to be taken out by connecting a suitable sensor (specified later) to the conductive metal base plate layer. Further, this invention can be applied to detect the conditions mentioned above in the space of the equipment, other than an engine, having the space to be sealed.

According to eight aspect of the present invention, in the fifth aspect of the present invention, the cylinder bore side of the conductive metal base plate layer is connected to a preliminary heater for an engine, and the other side of the conductive metal base plate layer is connected to a power source. The preliminary heater for the engine is thus connected to the conductive metal base plate layer and power voltage is applied from the other end exposing outside, thereby increasing the temperature of the engine cylinder and the head and directly increasing the fuel or inhalation gas to improve efficiency for driving the engine when starting an engine or in a cool districts.

According to ninth aspect of the present invention, in the fourth aspect of the present invention, a supplementary discharge electrode for an engine is further formed at the cylinder bore side of the conductive metal base plate layer, and the other side thereof is connected with a power source. Thus the supplementary discharge electrode for an engine is formed on the conductive metal base plate layer and power voltage is applied from the other end exposing outside, thereby enabling supplemental discharge in the combustion chamber to prevent knocking and to contribute combustion efficiency.

DETAILED DESCRIPTION OF THE INVENTION

Figure 1:
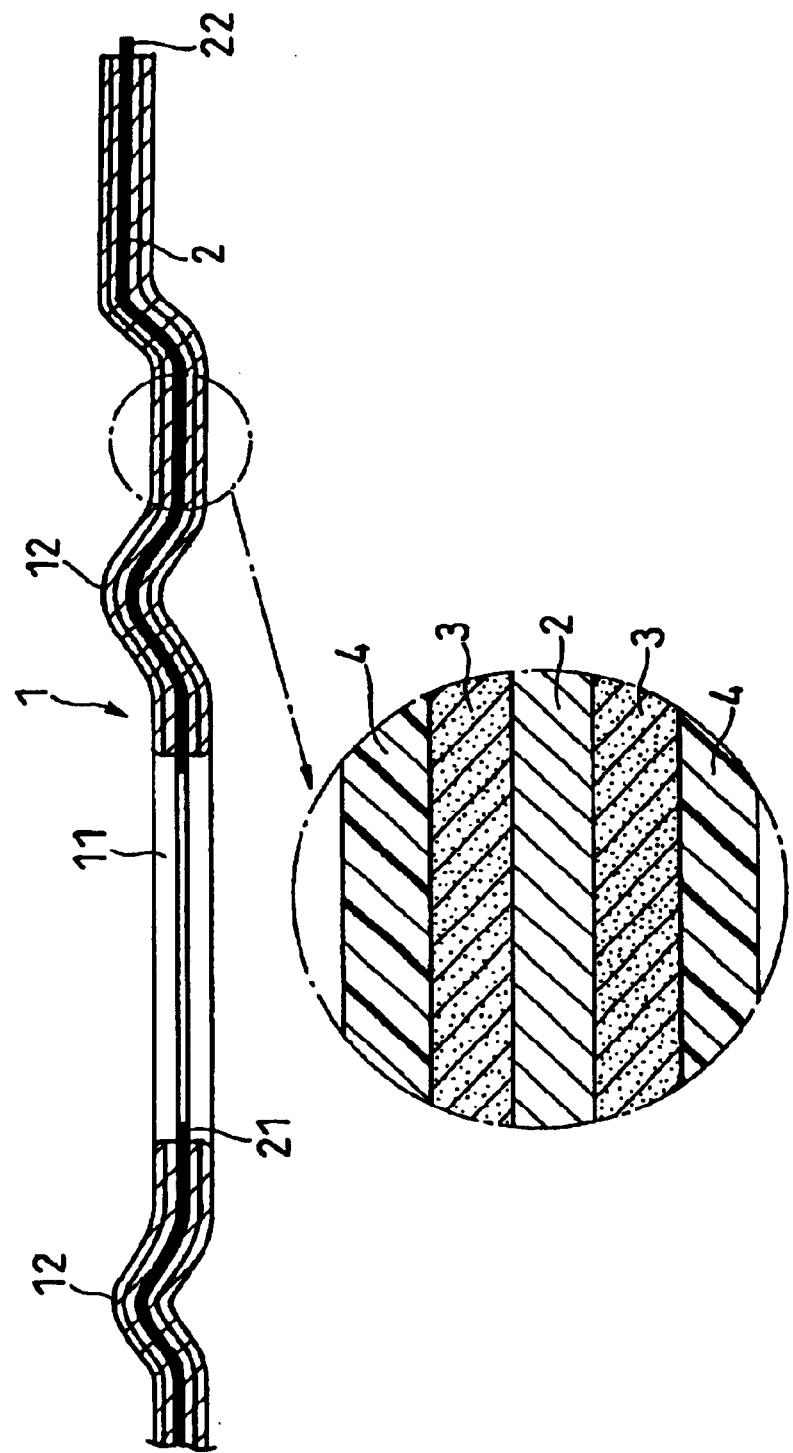
FIG. 1 is a partially cutout enlarged sectional view showing one embodiment of a multifunctional gasket of the present invention.
Figure 2:
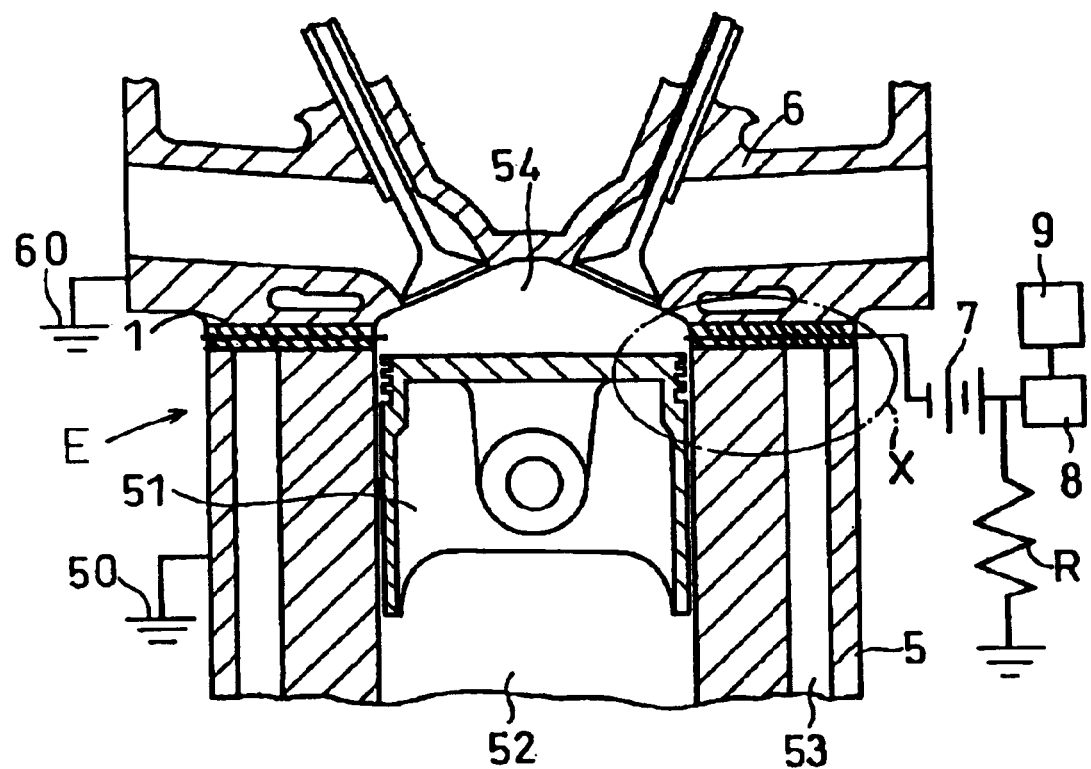
FIG. 2 is a vertical sectional view showing an essential part of an engine assembled with a multifunctional gasket of the present invention.
Figure 3:
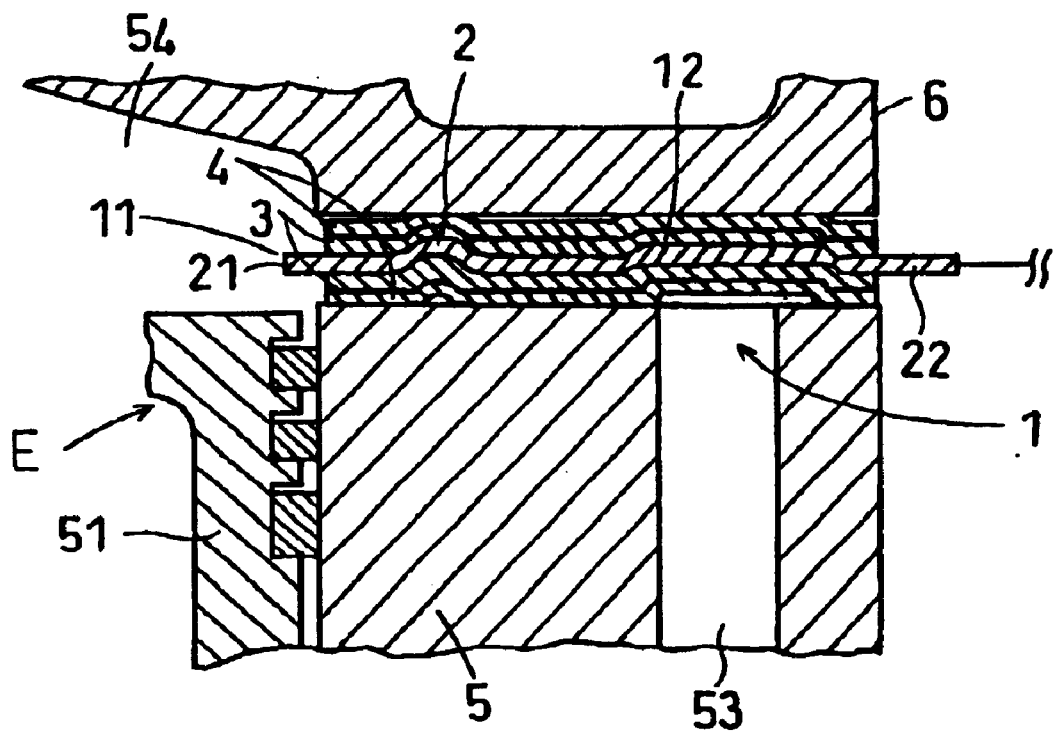
FIG. 3 is an enlarged view of the part "X" in FIG. 2.

Now preferred embodiments of the present invention are explained referring to the attached drawings. FIG. 1 is a partially cutout enlarged sectional view showing one embodiment of a multifunctional gasket of the present invention. FIG. 2 is a vertical sectional view showing an essential part of an engine assembled with a multifunctional gasket of the present invention. FIG. 3 is an enlarged view of the part "X" in FIG. 2.

In FIG. 1, a multifunctional gasket 1 of the present invention is a lamination body with three-ply structure comprising a conductive metal base plate layer 2 made of the above-mentioned metal sheet, electric insulation layers 3, 3 made of the above-mentioned material which are integrally formed on the upper surface and the lower surface of the conductive metal base plate layer 2, and microseal coating layers 4, 4 made of the above-mentioned material which are coated on the surfaces of the electric insulation layers 3, 3 to be integrated.

The above-mentioned multifunctional gasket 1 has an opening 11 formed corresponding to a space to be sealed (a cylinder bore in case of an engine) and an annular bead structure 12 is formed around the opening 11. The conductive metal base plate layer 2 is slightly projected into the inner periphery of the opening 11 to form a projecting portion (side end at the space side) 21 and an exposing portion (the other end) 22 is formed such that the conductive metal base plate layer 2 is partially exposed at the outer periphery of the multifunctional gasket 1.

The multifunctional gasket 1 is formed such that a sheet metal work is made on the metal sheet for the conductive metal base plate layer 2 so as to form a predetermined shape including a bore corresponding to the opening 11, the electric insulation layers 3, 3 and the microseal coating layers 4, 4 are laminated to be integrated and profiling such as bead structure 12 mentioned above is done by press working. The electric insulation layer 3 is made of the above-mentioned materials, so that a drift isn't caused in case of processing the bead structure 12, thereby preventing peeling which deteriorates insulation ability accompanied with the conductive metal base plate layer 2.

The case when the above-mentioned multifunctional gasket 1 is incorporated into an engine is explained referring to FIG. 2 and FIG. 3. The reference "E" indicates an engine assembled such that the multifunctional gasket 1 is provided on a cylinder block 5 and a cylinder head 6 is placed thereon so that the gasket 1 is intervened therebetween. The reference numeral 51 indicates a piston reciprocating up and down in a cylinder bore (a space to be sealed) 52 of the cylinder block 5 and the space formed with the upper end of the piston 51 and of the lower end of the cylinder head 6 is defined as a combustion chamber 54. The reference numeral 53 indicates a cooling medium communicating bore formed in the cylinder block 5 and is opened at the upper end surface of the cylinder block 5. Water, antifreeze liquid or oil is supplied to the cooling medium communicating bore 53.

According to thus assembled engine E, the facing surfaces of the cylinder block 5 and the cylinder head 6 are completely sealed with the multifunctional gasket 1 so as not to leak the combustion gas out of the combustion chamber 54. Specifically, the bead structure 12 is elastically deformed like FIG. 3 when being tightened and the setting pressure of the facing surfaces of the cylinder block 5 and the cylinder head 6 is strongly kept by the multifunctional gasket 1 intervened therebetween because of the restoring force of the elastic deformation. In addition, when the electric insulation layer 3 mentioned above is applied, a drift isn't caused in case of tightening, thereby preventing reduction of the tightening force.

Further, because the microseal coating layers 4, 4 are attached under pressure on the facing surfaces, the microseal coating layer 4 is filled in small concaves and convexes on the facing surfaces, thereby improving the sealing ability. Surface finishing is executed on the electric insulation layer 3 during forming process and micro concaves and convexes are produced on its surface. However, the microseal coating layer 4 also fills those micro concaves and convexes to be tightly attached to the electric insulation layer 3 to be integrated. The microseal coating layer 4 not only fills the micro concaves and convexes but also achieves insulation function. The conductive metal base plate layer 2 is electrically insulated against the facing surfaces by the electric insulation layers 3, 3 which are attached to both surfaces thereof.

The projecting portion 21 of the conductive metal base plate layer 2 faces the combustion chamber 54 and is used as an electrode for detecting ion current at the combustion gas side. The projecting portion 21 into the combustion chamber 54 as the electrode at the combustion gas side may be all around the inner circumference of the opening 11 or may be a part thereof. As shown in FIG. 2, a power 7, an amplifier 8 and a signal processing unit 9 are connected to the exposing portion 22 of the conductive metal base plate layer 2 when the engine E is assembled. The cylinder block and the cylinder head 6 are grounded as shown like the reference numeral 50, 60, however, one of them is grounded.

When voltage, for example 90V, is applied by means of the power source 7 between the exposing portion 22 and the cylinder block 5 and the cylinder head 6 which are ground electrodes, a circuit is formed via a fire area under ionic condition at the moment when fire is reached to the projecting portion 21 as an electrode projecting into the combustion chamber 54. The instant current value is amplified with the amplifier 8 to be processed in the signal processing unit 9, thereby detecting the combustion characteristic (combustion time and so on) in the combustion chamber 54. The conductive metal base plate layer 2 functionates as a core material of the multifunctional gasket 2 and also functionases as an ion sensor of fire in the combustion chamber 54.

Figure 4:
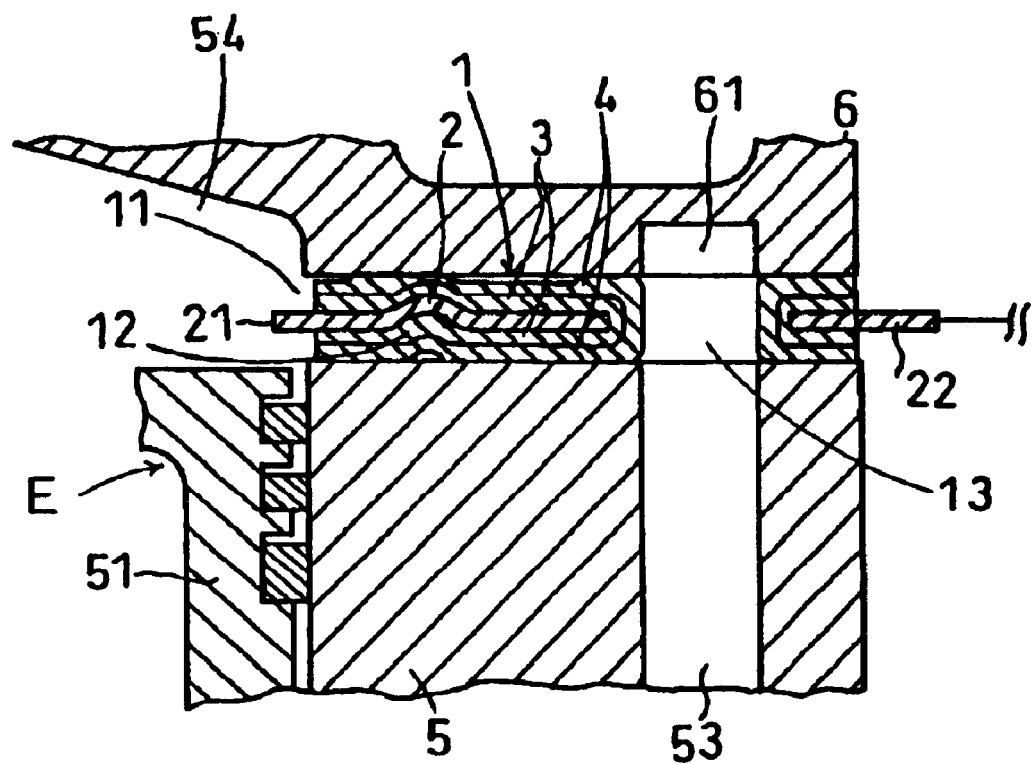
FIG. 4 is an enlarged view of the part "X" of the modified embodiment.

According to the embodiment shown in FIG. 4, a cooling medium communicating bore 61 is formed in the cylinder head 6 corresponding to the cooling medium communicating bore 53, a cooling medium is communicated through both cooling medium communicating bores 53, 61 so as to be applied for cooling the engine. A communicating bore 13 is provided for the multifunctional gasket 1 at the position corresponding to the openings of both cooling medium communicating bores 53, 61. The electric insulation layer 3 and the microseal coating layer 4 are formed so as to coat the opening edge of the conductive metal base plate layer 2 where the communicating bore 13 is formed. Therefore, while keeping communication of the cooling medium through both cooling medium communicating bores 53, 61, its leak prevention function is achieved as mentioned above. Other construction is the same as that mentioned above and the same reference numerals are allotted to omit the explanation.

Figure 5:
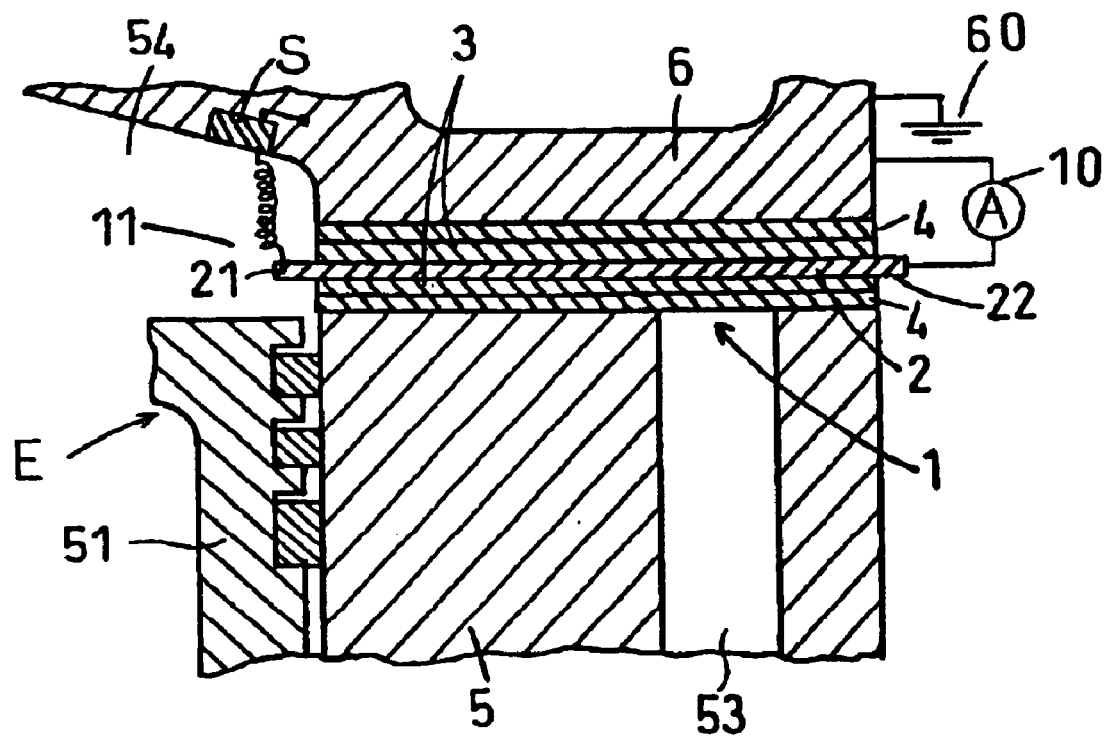
FIG. 5 is an enlarged view of the part "X" showing an embodiment when a sensor is embedded in the internal wall of a combustion chamber of an engine.
Figure 6:
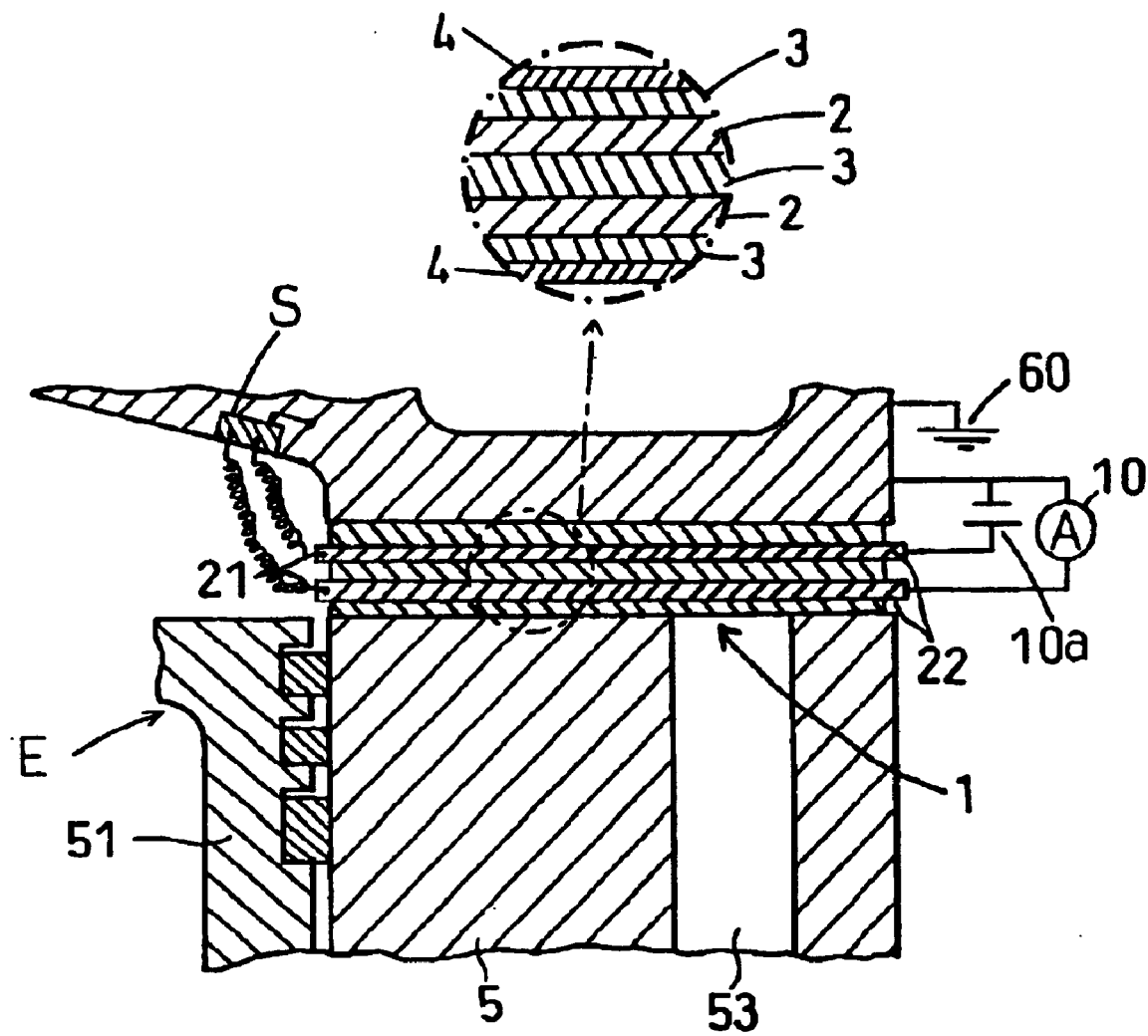
FIG. 6 is an enlarged view of the part "X" of a modified embodiment.

In FIG. 5 and FIG. 6, several kinds of sensors S are embedded in the inner wall of the combustion chamber 54, and the sensor S and the conductive metal base plate layer 2 are electrically connected so that the electrical information of the sensor S is converted into electric signals to be taken out. Examples of the sensor S are a piezo resistance type pressure sensor utilizing that a specific resistance is changed by pressure, a semiconductor titania $O_2$ sensor for detecting an air fuel ratio, a sensor utilizing a yttria type perovskite semiconductor for measuring temperature and resistance, a silicone strain gage as a pressure-voltage converting element, a knocking sensor for detecting vibration, and so on.

The exposing portion 22 of the conductive metal base plate layer 2 and the grounded cylinder head 6 are connected via an ampere meter 10, thereby reading the characteristic change in each sensor S by changing the current in the ampere meter 10. FIG. 6 shows an embodiment using a two wire system sensor as a sensor S and for this purpose the multifunctional gasket 1 of the present embodiment is a laminated construction including two layered conductive metal base plate layers 2, 2. Namely, an electric insulation layer 3 at the center is sandwiched with the two layered conductive metal base plate layers 2, 2, electric insulation layers 3, 3 are laminated outside thereof respectively, and further microseal coating layers 4, 4 are formed on the most outer layer respectively. Two leads from the sensor S are electrically connected to the two layered conductive metal base plate layers 2, 2 respectively. The reference numeral 10a indicates a DC power source.

Although a bead structure 12 isn't shown in FIG. 5 and FIG. 6, it goes without saying that there is a bead structure 12 as mentioned above. Other construction is the same as that mentioned above, so that the common members have the same reference numerals to omit their explanation.

Figure 7:
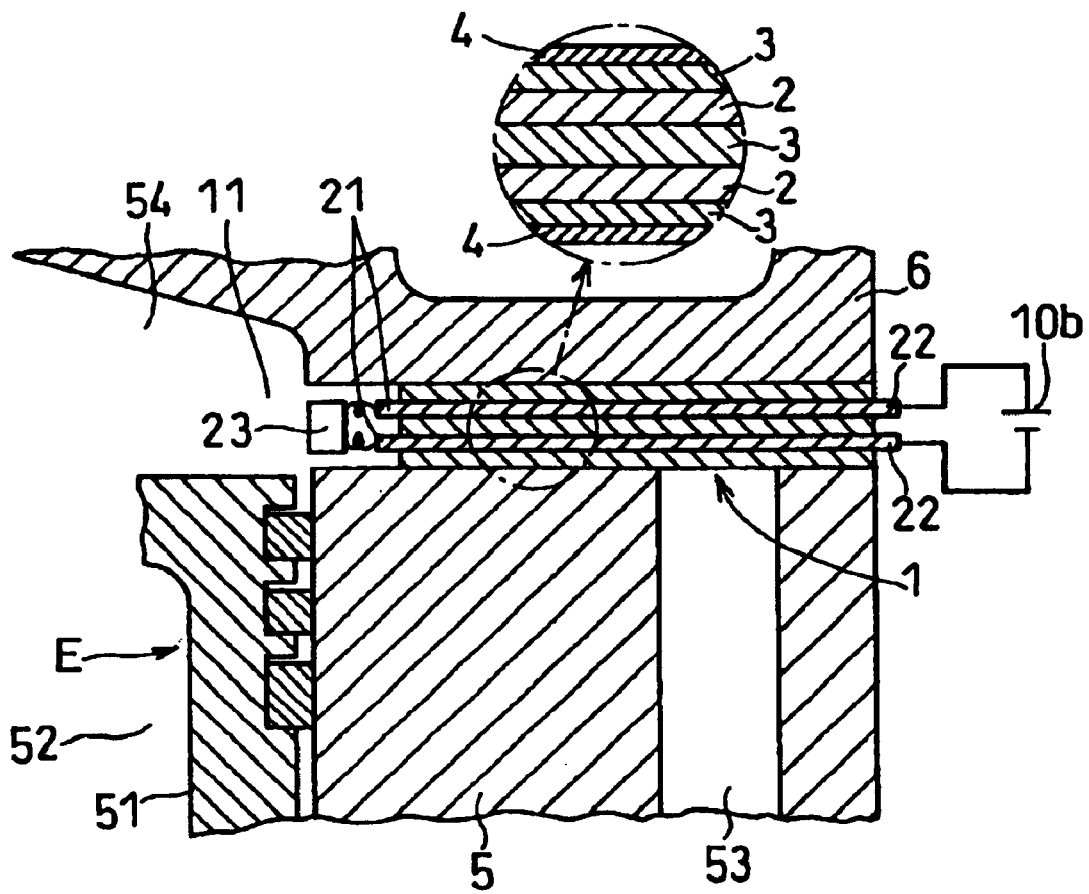
FIG. 7 is an enlarged view of the part "X" of other embodiment.

FIG. 7 shows an embodiment in which the fuel or inhalation gas in the cylinder block 5, the cylinder head 6, and the combustion chamber 54 of the engine E is able to be preliminary heated. A heater 23 is connected to the side ends 21, 21 at the cylinder bore 52 side of the conductive metal base plate layers 2, 2 comprising the gasket 1 like FIG. 6 and a power source 10b is connected to the other ends 22, 22, enabling to apply voltage to the heater 23 via the conductive metal base plate layers 2, 2. Thus applied voltage makes the heater 23 generate heat and makes the fuel or inhalation gas in the cylinder block 5, the cylinder head 6, and the combustion chamber 54 of the engine E increase temperature, thereby achieving efficiency of driving an engine at cold districts.

Figure 8:
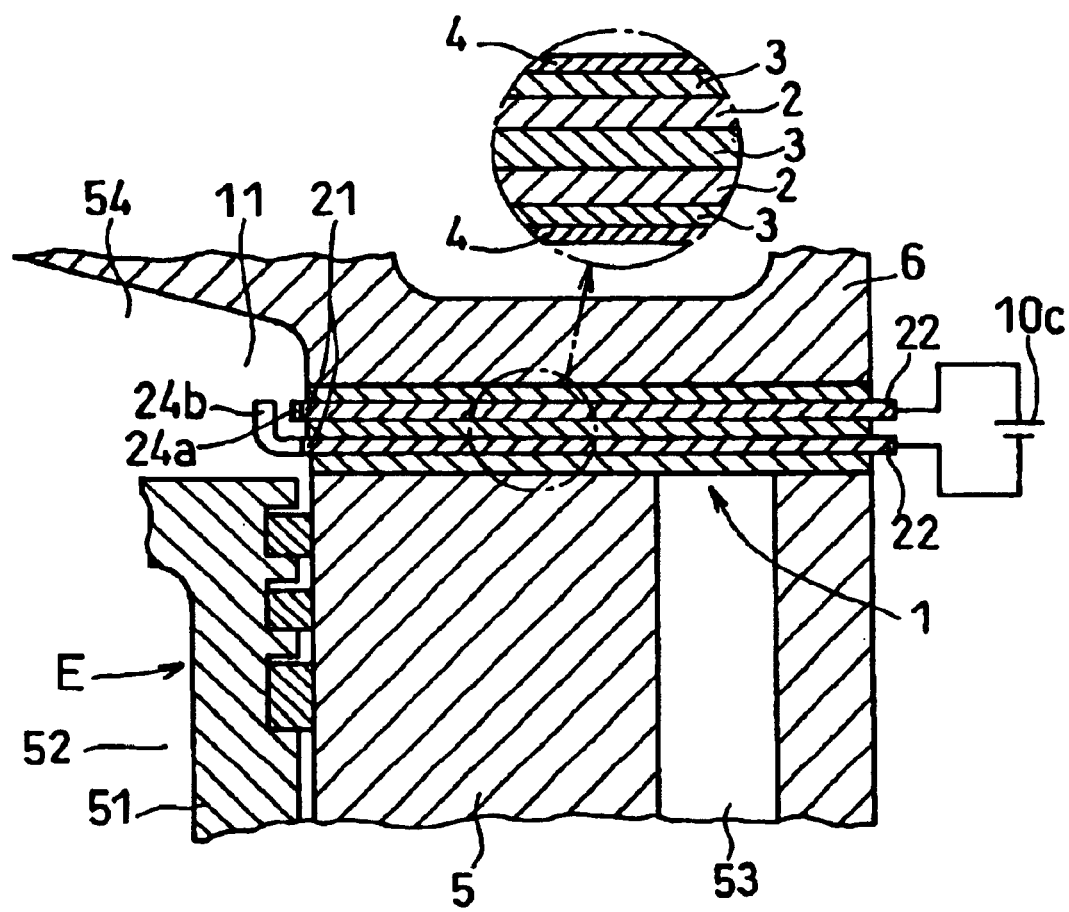
FIG. 8 is an enlarged view of the part "X" of still other embodiment.

FIG. 8 shows an embodiment wherein a supplemental discharge of combustion in the combustion chamber 54 is able in the above-mentioned engine E. Discharge electrodes 24a, 24b are provided at the side ends 21, 21 at the cylinder bore 52 side of the conductive metal base plate layers 2, 2 comprising the gasket 1 like FIG. 6, a power source 10c is connected to the other ends 22, 22, thereby enabling to apply voltage between the electrodes 24a, 24b via the conductive metal base plate layers 2, 2. As the result, electric discharge is done between both electrodes 24a, 24b to promote combustion in the combustion chamber 54, preventing knocking to contribute to the combustion efficiency.

According to the heater 23 and the discharge electrodes 24a, 24b of the embodiments shown in FIG. 7 and FIG. 8, plural heaters and plural discharge electrodes are provided along the circumference of the cylinder bore 52 with a space and the number thereof isn't specified. Also in FIG. 7 and FIG. 8 a bead structure 12 isn't shown, however, it goes without saying that it exists as mentioned above. Other constructions of this embodiment is the same as those mentioned above, therefore, the common members also have the same reference numerals and their explanations are omitted here.

In the above-mentioned embodiments, the present invention is applied to an automobile engine and the like, however, the present invention isn't limited to that. It can be widely applied to a gasket which is intervened between two objects including a space to be sealed. Further if it is used in the vehicle engine, the engine is not only limited to a single cylinder, but also is applied to an engine comprised of multi cylinders. In this case, it is optionally selected whether one multifunctional gasket 1 mentioned above is provided for each cylinder or one multifunctional gasket 1 which is commonly used for multi cylinders is provided.

What is claimed is:

1. A multifunctional gasket intervened between two objects including a space to be sealed, said gasket comprising:

a conductive metal base plate layer;

an insulation layer integrally laminated at the upper and lower surfaces of said conductive metal base plate layer; and a microseal coating layer coated on the outer surface of said insulation layer;

wherein an annular bead structure is provided around an opening formed corresponding to said space; and wherein said gasket is intervened between said two objects to be integrated, one end of said conductive metal base plate layer faces the inside of said space and the other end thereof is exposed outside.

2. The multifunctional gasket as set forth in claim 1, wherein said conductive metal base plate layer is formed of any one of metal sheet with 0.1 to 0.5 mm thickness, selected from a low carbon steel plate, stainless steel plate, an aluminum plate, and a copper plate.

3. The multifunctional gasket as set forth in claim 1, wherein said conductive metal base plate layer has a thickness of 1 $\mu$m to 0.5 mm and is formed of any one of a process layer selected from a plastic layer, a ceramic layer, a ceramic fiber layer, an asbestos layer, an adhesive layer, or such conductive metal base plate layer of which surface is processed with a metal surface processing agent.

4. The multifunctional gasket as set forth in claim 1, wherein said microseal coating layer has a thickness of 1 $\mu$m to 0.5 mm and formed of such layer that any one of layer selected from a rubber material including an inorganic power material, a plastic material, or an adhesive is integrally covered on said conductive metal base plate layer.

5. The multifunctional gasket as set forth in claim 1, wherein said two objects are a cylinder block and a cylinder head of an engine respectively and said space is a cylinder bore.

6. The multifunctional gasket as set forth in claim 5, wherein an information concerning the electrical variance in said cylinder bore is led out in the from of electrical signal from said conductive metal base plate layer.

7. The multifunctional gasket as set forth in claim 6, wherein said electrical signal concerns information on a combustion characteristic in said cylinder bore.

8. The multifunctional gasket as set forth in claim 5, wherein the cylinder bore side of said conductive metal base plate layer is connected to a preliminary heater for an engine, and the other side of said conductive metal base plate layer is connected to a power source.

9. The multifunctional gasket as set forth in claim 5, wherein a supplementary discharge electrode for an engine is further formed at the cylinder bore side of said conductive metal base plate layer, and the other side of said conductive metal base plate layer is connected to a power source.

* * * * *